Jan. 31, 1933.  G. W. PECK  1,895,518
DIRIGIBLE AIRCRAFT
Filed Feb. 27, 1930
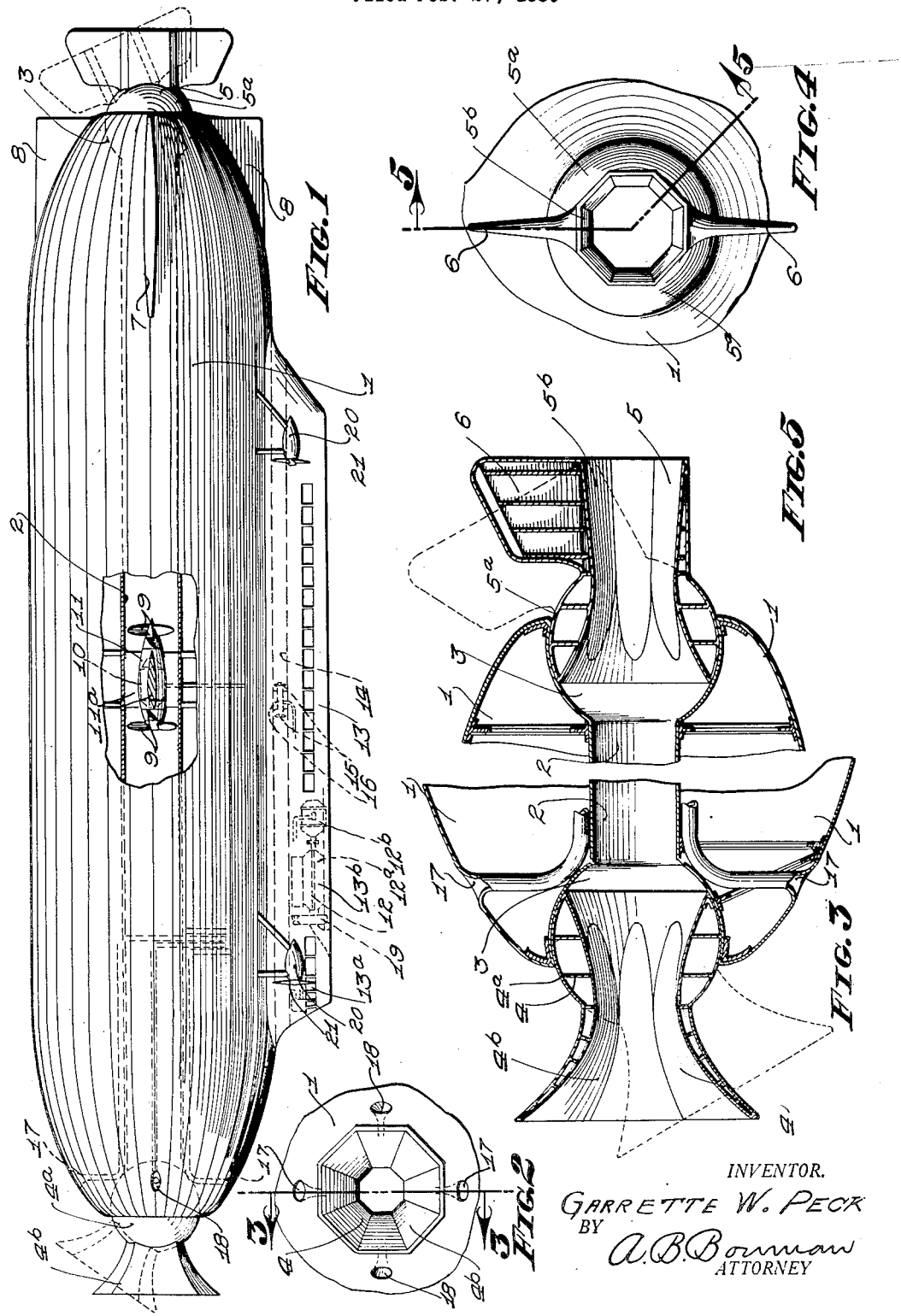
INVENTOR.
GARRETTE W. PECK
BY
A.B.Bowman
ATTORNEY Patented Jan. 31, 1933

1,895,518

UNITED STATES PATENT OFFICE

GARRETTE W. PECK, OF SAN DIEGO, CALIFORNIA

DIRIGIBLE AIRCRAFT

Application filed February 27, 1930. Serial No. 431,704.

My invention relates to dirigible aircraft, and the objects of my invention are: First, to provide an aircraft which though of large dimensions is easy to maneuver; second, to provide a dirigible aircraft in which a large proportion of the head resistance is eliminated; third, to provide a dirigible structure in which a slip stream is maintained on the control surfaces even when the airship is hovering or standing still, thus facilitating the maneuvering of the airship when landing or taking off; fourth, to provide a dirigible aircraft in which the control or guiding means may be shifted vertically, horizontally or angularly relative thereto so as to enable the aircraft to be shifted in any possible direction; fifth, to provide a dirigible aircraft in which blasts of air directed at right angles to the axis of the aircraft near the forward end thereof are used to control the movement of said end when maneuvering the aircraft; sixth, to provide a dirigible aircraft in which a central, longitudinally extending tube not only forms a tunnel for the flow of air necessary for propelling the aircraft, but also forms main stiffening support of the aircraft; seventh, to provide a novel control means for an aircraft; and eighth, to provide an aircraft which has relatively great carrying power in proportion to its weight and size, which may be easily handled with a minimum crew, and which may be operated independent of weather conditions.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon, which form a part of this application, in which:

Figure 1 is a substantially diagrammatical, side elevational view of my dirigible, with parts and portions broken away and in section to facilitate the illustration; Fig. 2 is a fragmentary front elevational view thereof; Fig. 3 is an enlarged, substantially diagrammatical, fragmentary sectional view thereof, through 3—3 of Fig. 2; Fig. 4 is a fragmentary rear elevational view of my dirigible structure; and Fig. 5 is an enlarged fragmentary substantially diagrammatical sectional view thereof through 5—5 of Fig. 4.

Similar characters of reference refer to similar parts and portions throughout the several views of the drawing.

Hull 1, main air passage 2, socket means 3, air scoop and forward control member 4, air discharge and rear control member 5, rudders 6, stabilizers 7 and 8, main air impellers 9, main driving motor 10, housing 11, power plant 12, cabin 13, auxiliary air passage 14, auxiliary air impellers 15, auxiliary driving motor 16, vertically acting maneuvering jets 17, horizontally acting maneuvering jets 18, air compressor 19, nacelles 20, and propellers 21 constitute the principal parts and portions of my dirigible aircraft structure.

A hull 1 is provided which has approximately the outline of a conventional dirigible hull; however, the hull 1 is provided with a longitudinally extending, centrally located main air passage 2, which intersects the forward and rear ends of the hull 1, as indicated by the dotted lines in Fig. 1, and shown in Figs. 3 and 5.

At the forward end of the hull 1, there is the main air passage formed into a socket means 3, in which fits a hollow, semi-spherical portion 4a of a forward control member 4. Forwardly of the ball portion 4a, the forward control member 4 flares outwardly forming an air scoop portion 4b, which communicates with the interior of the ball portion 4a. By reason of the ball portion 4a and the socket 3, the forward control member 4 may be shifted in any direction relative to the passage 2, as indicated by the dotted lines in Figs. 1 and 3. In order to maintain an open way between the control member and passage 2, the rear end of the forward control member 4 within the ball portion is also flared, as shown in Fig. 3, though not to such an extent as the forward or air scoop 4b. As shown in Figs. 1, 2, and 3, it is preferred that the air scoop portion 4b be polygonal in cross section, preferably eight-sided.

At the rear end of the main air passage 2, there is provided a second socket means 3 similar in construction to the socket means at the forward end of the passage.

Pivotally mounted within the rear socket means 3 is a hollow ball portion 5a of the rear control member 5 similar in construction to the ball portion 4a. Rearwardly of, and forming a continuation of the ball portion 5a, the rear control member forms an air discharge orifice 5b, which may flare outwardly if desired, as shown in Fig. 5.

As the rear control member 5 may be displaced angularly relative to the main passage 2, the forward end of the control member 5 is flared so that regardless of the angular displacement of said control member, the passage 2 will always communicate with the opening through the rear control member, as shown by the dotted lines in Fig. 5. The rear control member 5, is, like the forward control member, made polygonal in cross section.

Mounted on the upper and lower sides of the rear control member 5, is a pair of vertically positioned rudders 6, which are acted upon by the air stream passing over the outside of the dirigible. In addition, the rear portion of the hull may be provided with horizontal and vertical stabilizers 7 and 8, respectively.

Positioned within the air passage 2, intermediate its ends, are a plurality of main air impellers 9, which are driven by a main driving motor 10, preferably an electric motor, as indicated by dotted lines in Fig. 1. The motor 10 is supported in a housing 11 which is held in central relation to the main air passage 2 by webs 11a.

Mounted at the lower side of the hull 1, is a cabin 13, in which are located the pilot's compartment 13a, engine room 13b, and passenger or freight compartment 13c. In the engine room is a power plant 12, preferably comprising an internal combustion engine 12a driving an electric generator 12b.

Formed in the cabin 13, and extending longitudinally therein, from end to end, is an auxiliary air passage 14, similar in structure to the main air passage 2, although of smaller diameter. Mounted within the air passage 14 are auxiliary air impellers 15 and an auxiliary driving motor 16, preferably an electric motor which is supplied with electricity from the generator 12b. The auxiliary air passage 14 is preferably positioned adjacent the under side of the hull 1.

Near the forward end or bow of the hull 1, there is provided a pair of vertically acting maneuvering jets 17. These jets extend in a plane at right angles to the axis of the hull and are flared at their orifices so as to spread the ejected air over a relatively large area and thereby increase the effectiveness of air issuing from said jets. In addition, horizontally acting maneuvering jets 18 are adapted to eject air horizontally in opposite directions. These four jets are connected through suitable conduits, each independently controlled, to an air compressor 19.

In addition to the impellers 9 and 15, nacelles 20 may be supported on the outside of the hull 1, in which are mounted suitable motors for driving conventional propellers 21.

The operation of my dirigible aircraft is as follows: Ordinary maneuvering is obtained by shifting the position of the forward and rear control members 4 and 5, respectively. If both forward and rear control members are turned upwardly, the nose of the dirigible is caused to raise. Conversely, if the control members 4 and 5 face downwardly, the nose of the dirigible is caused to settle. Also, the control members 4 and 5 are arranged in opposed relation, which enables the airship to settle or rise while keeping its longitudinal axis horizontal.

Furthermore, by reason of the universal joint arrangement between the control members 4 and 5 and the hull 1, they may be tilted in any desired direction relative to the hull so as to guide it in a horizontal plane and in a vertical plane, or if desired, may guide it in a combination of the two planes, that is, at an angle with the horizontal so as to shift the ship sideways and upward at the same time.

By turning the control members in a horizontal plane, it is possible to counteract the side slip of the dirigible due to side winds. By reason of the main air passage 2, and the impellers therein which cause a rapid flow of air therethrough, the majority of the air in front of the dirigible is drawn in through the air scoop 4b of the forward control member, thereby reducing the head resistance.

It will be noted that though the dirigible be standing still relative to the ground, the impellers 9 maintain a slip stream for the forward and rear control members which permits their functioning at all times, thus increasing the maneuverability of the dirigible when being moored, or when taking off.

In addition to the control members 4 and 5, the maneuvering jets 17 and 18 enable the nose of the dirigible to be raised or lowered, or moved sideways, as desired, by operating the valves controlling the various conduits connecting the various jets. Thus, by operating one horizontal jet and one vertical jet, the nose of the airship can be moved upwardly or downwardly at an angle of about forty-five degrees.

It is obvious from the construction as illustrated in the drawing and described in the foregoing specification that there is provided a dirigible structure as aimed at and set forth in the objects of the invention; and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a dirigible structure, a main air passage extending therethrough, impeller means for causing a flow of air through said passage, a control means having the cross section of a regular polygon and a universal joint connecting said control means with said passage so that said control means may be angularly displaced in any desired direction relative to said air passage.

2. In a dirigible aircraft, a hull, an air passage therethrough, control means mounted at one end of, and arranged to receive air from said passage, and other control means mounted at the opposite end of said passage, said control means having the cross section of regular polygons, and angularly displaceable in any direction relative to said air passage.

3. In a dirigible structure, a hull, a main air passage, a rear control means mounted at the rear end of said passage, a universal joint connection between said control means and said passage, impeller means for causing a flow of air through said passage, a forward control means mounted at the forward end of said passage, and a universal joint connecting said forward control means with said passage, all the walls of each of said control means diverging substantially equally toward their extended ends, the walls of said forward control means being arranged at a greater divergence than those of said rear control means, thereby forming an air scoop.

4. In a craft, a body member, a fixed conduit associated therewith, a shiftable conduit connected to an end of said fixed conduit, means for causing a flow of a fluid through said fixed and shiftable conduits, and fins on the exterior of said shiftable conduit, said shiftable conduit adapted to exert a directional influence upon the fluid passing therethrough, said fins adapted to exert a directional influence upon the medium through which said craft travels, whereby said shiftable conduit and said fins, together form a co-acting directional control means for said craft.

5. In an air craft, a sustaining means, a fixed conduit associated therewith, a shiftable conduit forming a continuation thereof, means for causing a flow of air through said conduits, and fins on the exterior of said shiftable conduit, said fins and said shiftable conduit respectively arranged to exert a directional control upon air passing around said sustaining means and upon the air passing through said conduits.

6. In an airship, a dirigible hull, a fixed tube extending longitudinally therethrough, a shiftable tube continuing from said fixed tube, and protruding from said hull, means for causing a flow of air through said tubes, and fins on the exterior of said shiftable tube, said shiftable tube adapted to exert a directional influence upon the air streams passing through said fixed tube, said fins adapted to exert a directional influence upon the air streams passing around said hull, said fins and shiftable tube together forming a co-acting directional control means for said hull.

7. In an aircraft, a sustaining means, a fixed conduit associated therewith, a shiftable conduit forming a continuation thereof at one end, a second shiftable conduit forming a continuation thereof at the opposite end of said fixed conduit, and fins on the exterior of one of said shiftable conduits, said fins and said shiftable conduits respectively arranged to exert directional control upon air surrounding said sustaining means and upon the air passing through said conduits.

8. In an aircraft, a sustaining means, a fixed conduit associated therewith, a shiftable conduit forming a continuation thereof at one end, a second shiftable conduit forming a continuation thereof at the opposite end of said fixed conduit, fins on the exterior of one of said shiftable conduits, air passage conduits extending from the outer side of said sustaining means inwardly to said fixed conduits intermediate its ends, said fins, said air passage conduits, and said shiftable conduits arranged to exert directional control upon air surrounding said sustaining means and upon the air passing through said conduits.

In testimony whereof, I have hereunto set my hand at San Diego, California, this 21st day of February, 1930.

GARRETTE W. PECK.